US011960997B1

(12) United States Patent
Huang et al.

(10) Patent No.: US 11,960,997 B1
(45) Date of Patent: Apr. 16, 2024

(54) CIRCUIT ARCHITECTURE WITH BIASED RANDOMIZATION

(71) Applicant: Amazon Technologies, Inc., Seattle, WA (US)

(72) Inventors: Randy Huang, Morgan Hill, CA (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 176 days.

(21) Appl. No.: 17/570,673

(22) Filed: Jan. 7, 2022

Related U.S. Application Data

(63) Continuation of application No. 15/714,924, filed on Sep. 25, 2017, now Pat. No. 11,250,319.

(51) Int. Cl.
*G06N 3/08* (2023.01)
*G06N 7/01* (2023.01)

(52) U.S. Cl.
CPC .................. *G06N 3/08* (2013.01); *G06N 7/01* (2023.01)

(58) Field of Classification Search
CPC .. G06F 7/70; G06N 3/08; G06N 7/01; H03M 1/04
See application file for complete search history.

(56) References Cited

U.S. PATENT DOCUMENTS

| 10,891,536 B1 * | 1/2021 | Merkel | G06N 3/044 |
| 2018/0165575 A1 * | 6/2018 | Henry | G06N 3/045 |

OTHER PUBLICATIONS

Ren, Ao, et al. "Sc-dcnn: Highly-scalable deep convolutional neural network using stochastic computing." ACM Sigplan Notices 52.4 (2017): 405-418. (Year: 2017).*
Ardakani, Arash, et al. "VLSI Implementation of Deep Neural Network Using Integral Stochastic Computing." arXiv preprint arXiv: 1509.08972v2 (2016). (Year: 2016).*
Ren, Ao, et al. "Designing reconfigurable large-scale deep learning systems using stochastic computing." 2016 IEEE International Conference on Rebooting Computing (ICRC). IEEE, 2016. (Year: 2016).*
"Linear-Feedback Shift Register", Wikipedia, Available online at: https://en.wikipedia.org/wiki/Linearfeedback_shift_register, 9 pages, Mar. 22, 2018.
"Pseudo Random Number Generation Using Linear Feedback Shift Registers", Maxim Integrated Products Inc., Available online at: https://www.maximintegrated.com/en/app-notes/index.mvp/id/4400 , 6 pages, Jun. 30, 2010.

(Continued)

*Primary Examiner* — Benjamin P Geib
(74) *Attorney, Agent, or Firm* — Kilpatrick Townsend & Stockton LLP

(57) ABSTRACT

Disclosed herein are techniques for classifying data with a data processing circuit. In one embodiment, the data processing circuit includes a probabilistic circuit configurable to generate a decision at a pre-determined probability, and an output generation circuit including an output node and configured to receive input data and a weight, and generate output data at the output node for approximating a product of the input data and the weight. The generation of the output data includes propagating the weight to the output node according a first decision of the probabilistic circuit. The probabilistic circuit is configured to generate the first decision at a probability determined based on the input data.

17 Claims, 8 Drawing Sheets

(56) References Cited

OTHER PUBLICATIONS

Non-Final Office Action, U.S. Appl. No. 15/714,924, 13 pages, dated May 26, 2021.
Notice of Allowance, U.S. Appl. No. 15/714,924, 5 pages, dated Oct. 7, 2021.
Colah, "Understanding LSTM Networks", Available online at: http://colah.github.io/posts/2015-08-Understanding-LSTMs/, 15 pages, Aug. 27, 2015.
Guan, et al., "FPGA-based Accelerator for Long Short-Term Memory Recurrent Neural Networks", 22nd Asia and South Pacific Design Automation Conference (ASP-DAC), 6 pages, 2017.
Qian, et al., "An Architecture for Fault-Tolerant Computation with Stochastic Logic", IEEE Transactions on Computers, vol. 60 Issue 1, 13 pages, Feb. 2011.

* cited by examiner

CIRCUIT ARCHITECTURE WITH BIASED RANDOMIZATION

CROSS-REFERENCE TO RELATED APPLICATIONS

This application is a Continuation of U.S. patent application Ser. No. 15/714,924, filed on Sep. 25, 2017, now U.S. Pat. No. 11,250,319 issued on Feb. 15, 2022, and entitled "CIRCUIT ARCHITECTURE WITH BIASED RANDOMIZATION," the content of which is herein incorporated by reference in its entirety.

BACKGROUND

Artificial neural networks are computing systems with an architecture based on biological neural networks. Artificial neural networks can be trained, using training data, to learn about how to perform a certain computing task.

A neural network may include a set of processing nodes. Each processing node can process a piece of the input data to generate an output, and the final decision can be generated based on a combination of the outputs of the set of processing nodes. As part of the processing, each processing node can perform a set of arithmetic operations such as, for example, floating-point multiplications and additions, etc. The arithmetic operations of the processing nodes may be performed by graphical processing units (GPU), which typically include circuitries and data paths optimized for high speed arithmetic operations.

BRIEF DESCRIPTION OF THE DRAWINGS

Various embodiments in accordance with the present disclosure will be described with reference to the drawings, in which.

DETAILED DESCRIPTION

Figure 1:
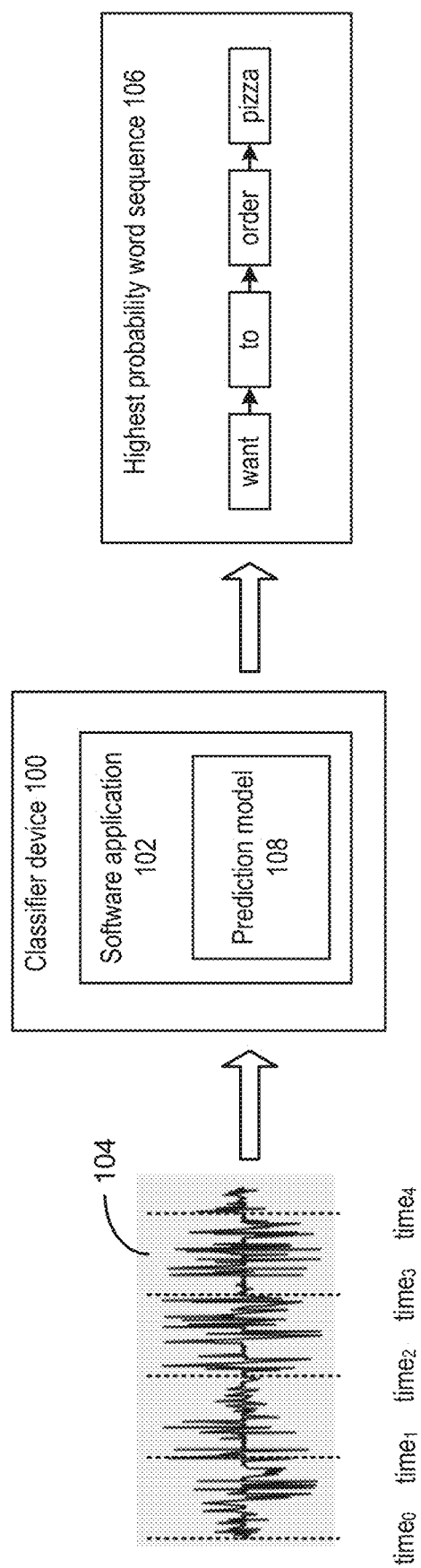
FIG. 1 illustrates an example classifier device that uses techniques disclosed herein to process a data sequence.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

An artificial neural network may include a set of processing nodes. Each processing node can process a piece of the input data to generate an output, and the final decision can be generated based on a combination of the outputs of the set of processing nodes.

One category of artificial neural network is recurrent neural network (RNN), which includes internal state to process a sequence of inputs. A recurrent neural network can be trained to determine an output based on a current input of the sequence, as well as a history of outputs of the neural network from prior inputs of the sequence. The recurrent neural network can track a degree of dependency of the current input on the prior outputs, which can provide a context for the neural network to determine the most likely output corresponding to the current input. As an example, the neural network may be processing a set of audio signals from a user uttering the sentence "I want to order a pizza". As the neural network is processing the last portion of the audio signals (e.g., to determine whether it corresponds to the word "pizza", "plaza", or "Piazza"), the neural network may refer the outputs from the prior portion of the audio signals (e.g., "order"), which the neural network stores as an internal state, and determine that the last portion of the audio signal most likely refers to foodstuff ("pizza") rather than a place ("plaza"), or the name of a person ("Piazza").

An example of RNN is Long Short Term Memory (LSTM) network. An LSTM can include a set of processing nodes for processing a set of input samples associated with a particular time point based on a history of processing of prior input samples. Each processing node can generate a candidate internal state based on a current input sample and a prior output. The processing node can also update an internal state based on selective combination of the candidate internal state and the stored internal state, to perform selective accumulation of processing history. The processing node can also generate a current output corresponding to the current input sample based on the updated internal state decision. The LSTM can generate a classification decision based on selective combination of the current outputs from the set of processing nodes. Referring to the example above, the LSTM can selectively accumulate the processing history of the speech signals corresponding to the phrase "I want to order a pizza", with a prior output "order" being given a larger weight. When processing the audio signal corresponding to "pizza", it is more likely that the LSTM will interpret the audio signal to represent the word "pizza" (rather than "plaza"), based on the larger weight given to the prior output "order".

The input samples, internal state, candidate internal state, and outputs are typically represented by floating-point numbers. For example, the input samples can be floating numbers representing an intensity of the audio signals, whereas the internal state, the candidate internal state, and the outputs are also floating-point numbers generated, either directly or indirectly, based on the floating-point input samples. Currently, an LSTM processing node can perform a set of floating-point multiplications to process this data, to perform the selective accumulation of processing history as well as selective combination of current outputs for decision generation. For example, the LSTM processing node may scale floating-point data representing the input sample, the internal state, the candidate internal state, and the output by an associated floating-point weight to perform selective combinations and/or accumulations (e.g., for processing history accumulation, decision generation, etc.). The scaling can be performed based on floating-point multiplications between the weights and the associated data.

To improve the speeds at which the arithmetic operations (especially floating-point multiplications) are performed and the decisions are generated, the processing nodes of the neural networks can be implemented with graphical processing units (GPU). GPUs typically include hardware circuitries (e.g., adders, multipliers, etc.) and data paths optimized to perform high speed arithmetic operations. Although GPUs can provide high performance, they tend to consume a lot of power. Moreover, the additional hardware circuitries and data paths of the GPUs also take up considerable chip space. All these can severely limit the application and deployment of computing devices that employ neural network architectures for computations and problem-solving.

Embodiments of the present disclosure relate to a neural network architecture that employs biased randomization to approximate the scaling of data by associated weight for generating classification decision. Specifically, to approximate the multiplication operation between the data and the associated weight, the neural network can perform probabilistic propagation of the weight at a pre-set probability. The neural network may include an output circuit to generate a sum of the propagated weights to approximate the multiplication operation. The probabilistic propagation can be controlled by a biased random decision generator, which can be configured to generate a propagation decision (i.e., to propagate the weight or not) at a target probability determined based on the data to be scaled. An example of a biased random decision generator can include a comparator that compares a random number generated by a uniformly-distributed random number generator and a threshold to generate the propagation decision, with the threshold being set based on the target probability. In the case of LSTM, a set of comparators and thresholds can be coupled with a single random number generator to perform multiple probabilistic propagations of a set of corresponding weights, to perform the scaling of each of the input sample, the internal state, the candidate internal state, and the output.

Given that a random number generator (e.g., a set of linear feedback shift registers), as well as the comparators, are typically much smaller and use much less power than floating-point multipliers, a neural network implemented with a random number generator in place of floating-point multipliers can lead to significant reduction in chip footprint as well as power consumption. As a result, computing devices that employ neural network architectures can become more portable, and can be deployed more easily to solve a wider range of problems.

FIG. 1 illustrates an example classifier device 100 that uses techniques disclosed herein to process a data sequence. Classifier device 100 can be, for example, a computing device operating a software application 102 to predict information included in a data sequence, and perform a pre-determined function based on the prediction. For example, classifier device 100 can be part of a personal assistant service provided to perform an errand based on a verbal communication from a user. It is understood that the personal assistant service is merely provided as an illustrative example, and that techniques disclosed herein can be used for other data processing applications including, for example, image/video processing, text-based data processing (e.g., processing of search queries), etc.

The personal assistant service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, in a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the personal assistant service when the client needs it and decommissioned when it is no longer needed, such that the resources supporting the personal assistant service (e.g., access to software application 102, and the underlying hardware resources for processing software application 102) can be reallocated to other clients.

As shown in FIG. 1, software application 102 can receive data samples of an audio signal sequence 104 from a user, perform analysis on the data samples, and predict a word sequence 106 spoken by the user from the audio signal sequence. Each word of the word sequence 106 may correspond to a portion of audio signal sequence 104. In the example of FIG. 1, classifier device 100 may predict that the portion of audio signal sequence 104 between $time_0$ and $time_1$ corresponds to the word "want", the portion of audio signal sequence 104 between $time_1$ and $time_2$ corresponds to the word "to", the portion of audio signal sequence 104 between $time_2$ and $time_3$ corresponds to the word "order", and the portion of audio signal sequence 104 between $time_3$ and $time_4$ corresponds to the word "pizza". Based on a prediction that audio signal sequence 104 most likely corresponds to "want to order pizza," software application 102 may, for example, submit an order to a pizza shop on behalf of the user.

Figure 2:
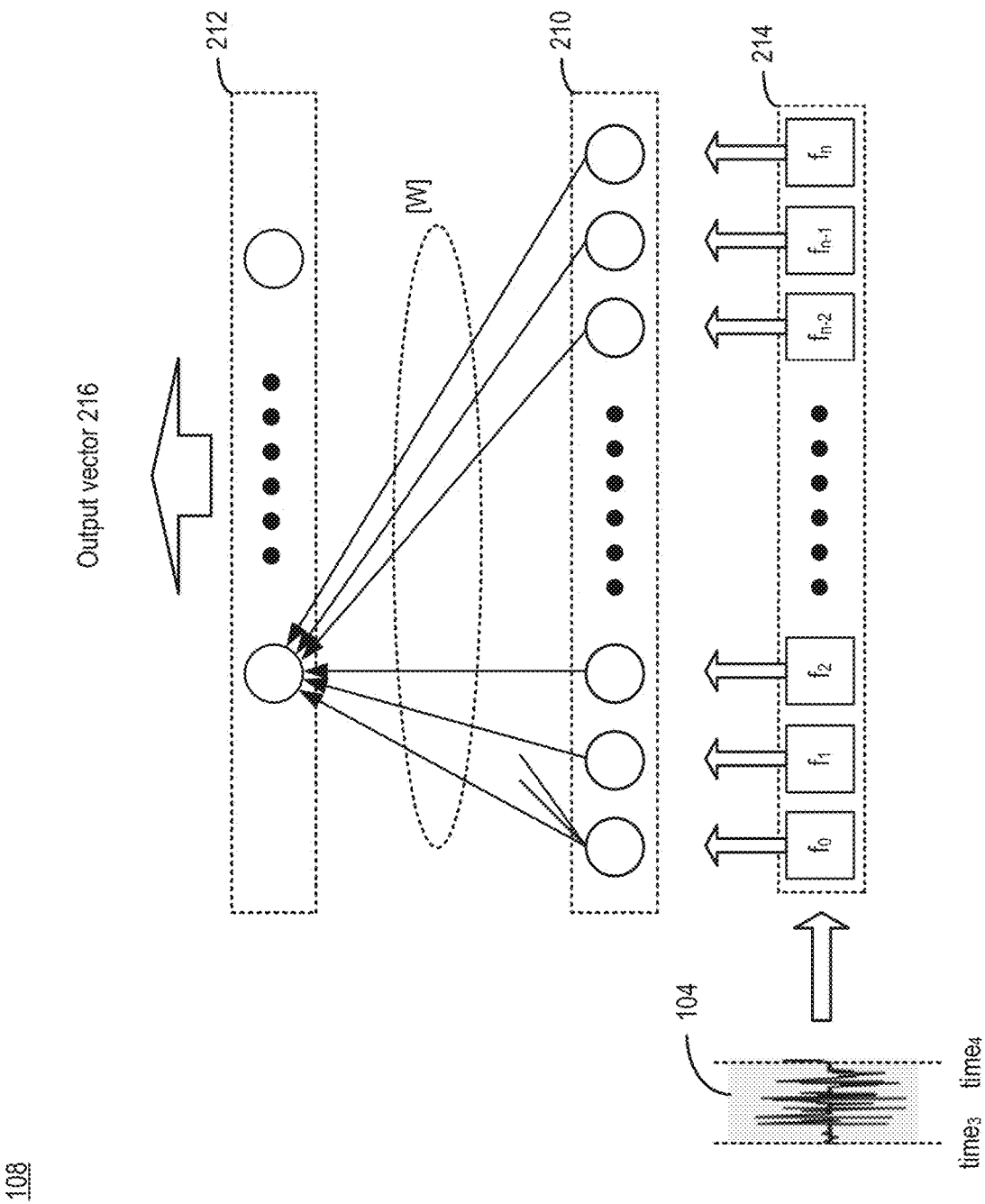
FIG. 2 is a simplified block diagram of a prediction model that uses techniques disclosed herein.

Software application 102 further includes a prediction model 108 for processing data samples of audio signal sequence 104 to predict a word sequence. Prediction model 108 can be in the form of an artificial neural network. The artificial neural network may include a plurality of processing nodes, with each processing node configured to process part of the input data. FIG. 2 illustrates an example of prediction model 108 that uses techniques disclosed herein. As shown in FIG. 2, prediction model 108 may include a set of processing nodes organized in two layers 210 and 212. Layer 210 may process data representing a portion of audio signal sequence 104 for a particular time point (e.g., between $time_3$ and $time_4$). The data can be frequency spectrum 214 that spans a frequency range. The data can include a set of floating-point vectors representing a distribution of signal power with respect to different frequencies within the frequency range. Each processing node of layer 210 can process a portion of frequency spectrum 214, such as a portion that corresponds to a frequency subrange (e.g., as denoted by $f_0, f_1, \ldots f_n$) of the frequency range to generate an output (e.g., a floating-point number). In prediction model 108, the output of each processing node of layer 210 is associated with a weight from a weight vector W. Each processing node of layer 212 can obtain an output scaled by the associated weight from each processing node of layer 210, and generate an element of output vector 216 by, for example, summing the scaled outputs from layer 210.

Output vector 216 may include various kinds of information which prediction model 108 can use to generate a decision. For example, output vector 216 may be compared against a reference vector associated with a word (e.g., "pizza"), and a decision about whether the input audio signals represent the word "pizza" can be made based on the comparison result. As another example, output vector 216 can also be mapped to a set of words, with each element of the vector representing a probability measurement of a word within the set of words. A decision about whether the input audio signals represent the word "pizza" can be made based on whether the probability measure of the word "pizza" is the highest among the set of words, as indicated by output vector 216.

The parameters of prediction model 108, including weight vector W and internal parameters of the processing nodes for processing inputs, may be configured in a training process. Prediction model 108 can be exposed to a set of training data associated with specific labels that reflect the content of the training data. For example, the set of training data may include a set of audio signal sequences including the words "order" and "pizza", as well as other words. The set of training data can also be associated with a set of target decisions. The set of audio signal sequences can be obtained from the same user at different times and/or at different locations. The set of audio signal sequences can also be obtained from other users. During the training, prediction model 108 can be provided with the set of training data, and the parameters of prediction model 108 can be updated based on an objective function such as, for example, to maximize the likelihood of prediction model 108 generating the target decisions from the set of training data. In some embodiments, the training can take place at a server, which then transmits the parameters to classifier device 100.

Figure 3A:
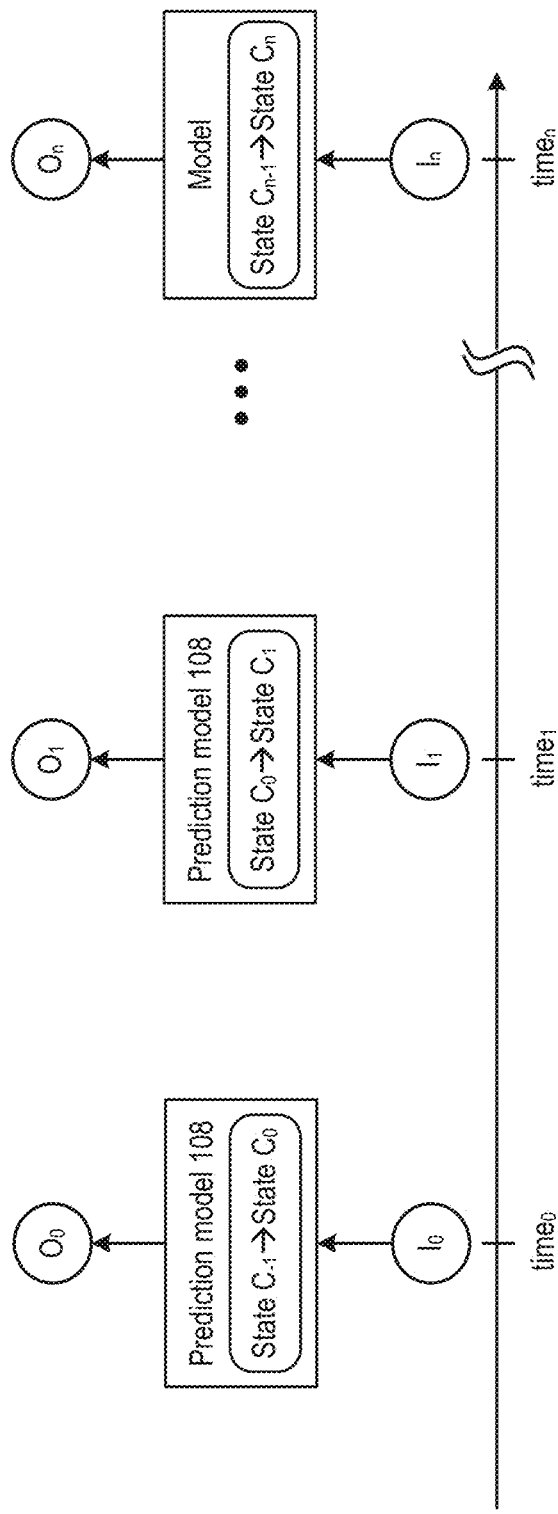
FIGS. 3A and 3B illustrate examples of components of the prediction model of FIG. 2, according to certain aspects of the present disclosure.

In some embodiments, prediction model 108 can include a recurrent neural network (RNN), which can take into consideration a history of prior decisions when generating a decision for an input. FIG. 3A illustrates an example of a sequence of operations of prediction model 108 configured as an RNN. As shown in FIG. 3A, prediction model 108 stores an internal state C, which can be used to maintain a running history of the outputs. Prediction model 108 can receive an input I of a data sequence, and generate an output O based on the input and the stored internal state. Prediction model 108 can also update the internal state based on the output, to maintain the running history. Each of internal state C, input I, and output O can be associated with a timestamp. In the example of FIG. 3A, prediction model 108 receives input $I_0$ at $time_0$. Based on the internal state $C_{-1}$, prediction model 108 generates output $O_0$ at $time_0$. Prediction model 108 also updates internal state $C_{-1}$ to $C_0$. At $time_1$, prediction model 108 receives input $I_1$, generates output $O_1$ based on internal state $C_0$, and then updates internal state $C_0$ to $C_1$. Prediction model 108 can continue the operations until it finishes processing the data sequence.

In some embodiments, prediction model 108 may include an LSTM network, which is one example of RNN. In an LSTM network, the influence of the internal state (the history of prior outputs) on the output, relative to the influence of the current input, can be adjusted. Moreover, the updating of the internal state based on the current output can also be adjusted. These arrangements enable more efficient tracking of the dependencies of current input on prior outputs, as well as more effective use of prior outputs as context for processing the current input, to improve the probability of making the correct classification.

As an illustrative example, the LSTM network may be processing an audio signal sequence that corresponds to "order pizza, and then call Mr. Piazza." After determining the first word "order", the LSTM may determine, based on training, that the next word is likely to be "pizza" (or other merchandises that are to be ordered). The LSTM may update an internal state value by storing a weighted average between the current internal state value and a value representing the word "order", with larger weight assigned to the output "order" to its influence on the classification of subsequent audio signals. The LSTM then processes the subsequent audio signals and determines the word "pizza" based on the strong influence of the prior output "order". Moreover, the LSTM can also determine the word "call" from the audio signals. Based on the training, the LSTM may also determine that subsequent audio signals following the word "call" are unlikely to correspond to the word "pizza" (rather, the recipient of a call is more likely a person). Therefore, the LSTM can decrease the influence of the prior output "order" by updating the internal state, with larger weight assigned to the output "call" and smaller weight assigned to the prior output "order". As a result, it becomes more likely for the LSTM to determine that the last portion of the audio signal sequence corresponds to "Piazza" (the name of a person), rather than "pizza", based on the context provided by the updated internal state.

Figure 3B:
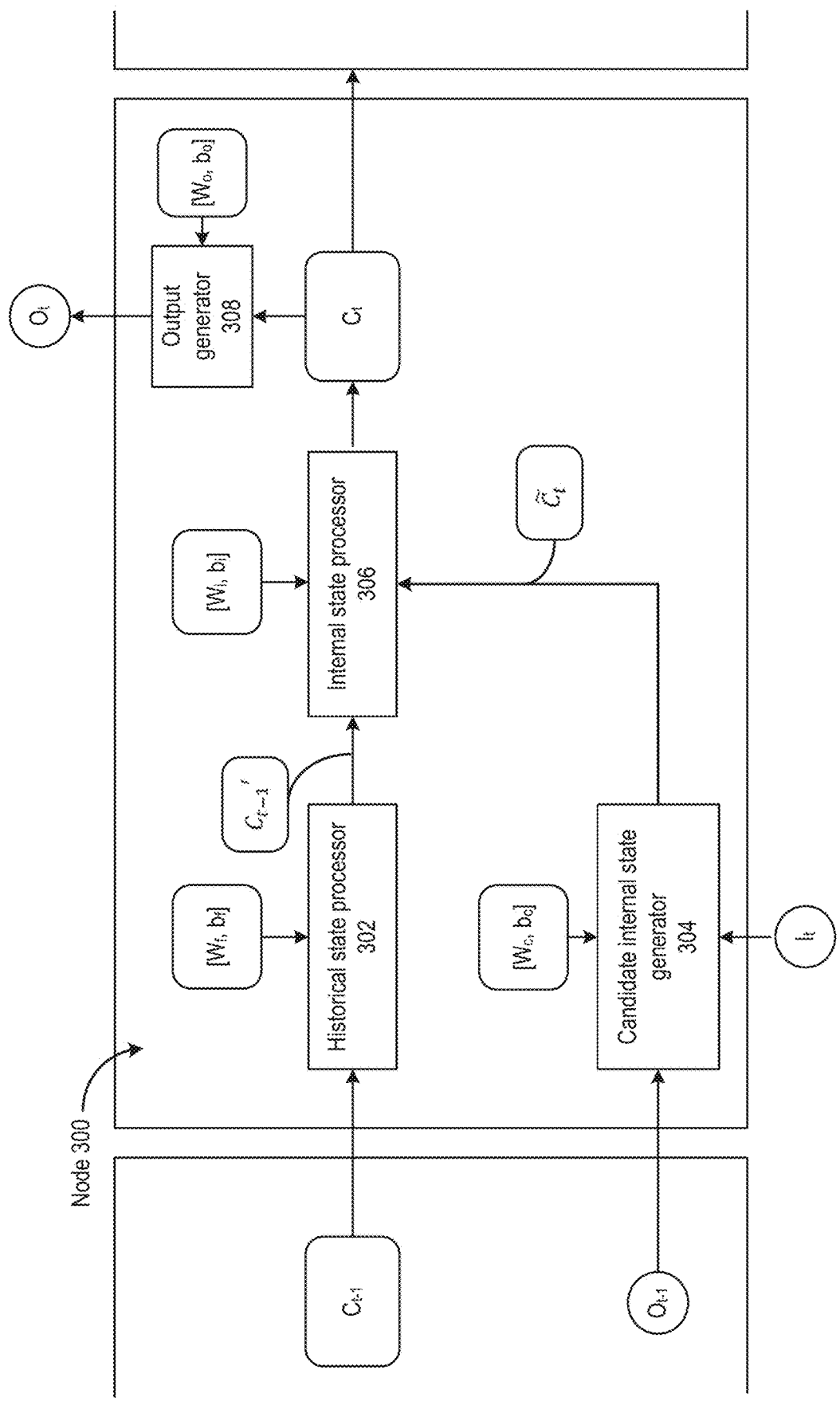

FIG. 3B illustrates an example of the internal structure of an LSTM processing node 300 that is part of prediction model 108, according to certain aspects of the present disclosure. As shown in FIG. 3B, processing node 300 includes a historical state processor 302, a candidate state generator 304, an internal state processor 306, and an output generator 308. Each of the historical state processor 302, candidate state generator 304, internal state processor 306, and output generator 308 can include hardware circuitries and/or software routines to perform computations for processing an input vector $I_t$ to generate an output vector $O_t$. Input vector $I_t$ can include a floating point numeric vector representing, for example, a frequency spectrum of audio signals associated with a timestamp t. Output vector $O_t$ may include a floating point numeric vector representing a probability distribution mapped to a set of words that can be represented by the audio signals associated with the timestamp t.

Processing node 300 also stores a prior output vector $O_{t-1}$ and internal state $C_{t-1}$, both of which are associated with a timestamp t−1 which is prior to timestamp t, and can be taken into account for generation of output vector $O_t$. Internal state $C_{t-1}$ may store a set of influence factors mapped to the set of words represented by the output vector. The influence factors may provide an indication of a degree of influence of a previously-determined word on the processing of subsequent audio signals. Using the example above, after determining that prior audio signals include the word "order", LSTM processing node 300 may increase the influence factor corresponding to the word "order" in the internal state, based on a determination that subsequent audio signals may include words related to "order", and providing the word "order" as a context can facilitate determination of the words included in the subsequent audio signals. Moreover, processing node 300 can also determine the influence factor based on prior output vector $O_{t-1}$ and current input vector $I_t$. Referring to the example above, if the prior output is "order" and the current input is "pizza", processing node 300 may determine that subsequent audio signals (after the current input) are unlikely to contain words related to "order", and can reduce the influence factor associated with the word "order" in the internal state.

Historical state processor 302 can update the influence factors included in internal state C. Specifically, historical state processor 302 can generate a forget factor $f$, which can be used to scale the influence factors included in updating of internal state C based on prior (historical) values of the internal state. Historical state processor 302 can generate the forget factor based on a set of weights $W_f$ and bias $b_f$ that are associated with forget factor generation and are generated based on a training process. In the training process prediction model 108 can be used to process a sequence of audio signals associated with pre-determined words. As part of the training process, weights $W_f$ and bias $b_f$ can be set to maximize the probability of prediction model 108 outputting the pre-determined words from the sequence of audio signals, which includes increasing or decreasing the influences exerted by the history of processing prior audio signals on the processing of a current set of audio signals. To achieve that, weights $W_f$ and bias $b_f$ can be set, for each of the set of words included (or reflected) in the prior values of the internal state, to selectively emphasize or deemphasize certain prior outputs of prediction model 108 in the history of processing maintained by the internal state. Referring to the example above, weights $W_f$ and bias $b_f$ may be set to maximize the probability of determining the word "pizza" (food) from a current set of audio signals based on an indication, from the prior internal state, a set of words related to the action of food ordering (e.g., including words related to the restaurant names, combination of verbs "would like", "order", etc.) has been determined previously, but words indicating the food ordered by the action is absent. On the other hand, weights $W_f$ and bias $b_f$ may also be set to minimize the probability of determining the word "pizza" from the audio signals, if the prior internal state indicates that a set of words comprising the action of food ordering as well as the food ordered have been determined previously.

Referring back to FIG. 3B, in some embodiments, historical state processor 302 can generate forget factor $f$ based on the following equation:

$$f=\sigma(W_f \cdot [O_{t-1}, i_t]+b_f) \quad \text{(Equation 1)}$$

In Equation 1, $f$ can be the forget factor. $W_f$ can be a weights vector associated with forget factor generation, whereas $b_f$ can be a bias factor associated with the forget factor generation. $O_{t-1}$ can be the output vector associated with a prior timestamp $t-1$, whereas, $i_t$ can be the input vector associated with a current timestamp t. $\sigma$ can be a sigmoid function. A sigmoid function can be configured as an activation function, and can accept an input and map the input to a fractional value between 0 and 1. An example of a sigmoid function is as follows:

$$\sigma(x) = \frac{e^x}{1+e^x} \quad \text{(Equation 2)}$$

In equation 2, $e^x$ can be an exponential function which accepts x as an input. In some embodiments, the sigmoid function of equation 2 can be represented by a mapping table that maps a set of input values of x to a set of corresponding pre-computed output values ($\sigma(x)$).

Referring back to Equation 1, $W_f \cdot [O_{t-1}, i_t]$ may represent a dot product between weights vector $W_f$ and output vector $O_{t-1}$ and input vector $i_t$. To generate the dot product, each element of weights vector $W_f$ can be multiplied with a corresponding element of output vector $O_{t-1}$ or input vector $i_t$ to generate a set or products, and the products of the elements can be accumulated to generate the dot product. The multiplications between weights vector $W_f$ and output vector $O_{t-1}$, and between weights vector $W_f$ and input vector $i_t$, can include a set of floating-point multiplications.

As discussed above, floating-point multiplications are typically very power intensive. Moreover, the hardware circuitries and data paths for floating-point multiplications may take up considerable chip space. All these can severely limit the application and deployment of computing devices that employ neural network architectures for computations and problem-solving. As to be discussed in more detail below, in lieu of performing floating-point multiplications, historical state processor 302 may employ a probabilistic switch, controlled based on $O_{t-1}$ and $i_t$, and an accumulator, to perform an estimation of the value of $W_f \cdot [O_{t-1}, i_t]+b_f$. Historical state processor 302 can map the estimation result using a mapping table representing Equation 2 to obtain an estimation of forget factor $f$. As discussed above, forget factor $f$ is a fraction value between 0 and 1. Historical state processor 302 may generate a forget factor $f$ for each element of prior internal state $C_{t-1}$.

After generating forget factor $f$, historical state processor 302 can generate an intermediate prior internal state $C_{t-1}'$ based on the following equation:

$$C_{t-1}'=f \times C_{t-1} \quad \text{(Equation 3)}$$

In lieu of performing floating-point multiplication, historical state processor 302 can also employ a probabilistic switch, controlled based on forget factor $f$, to perform an estimation of a result of multiplication between forget factor $f$ and prior internal state $C_{t-1}$, to generate the intermediate prior internal state $C_{t-1}'$. As discussed in more detail below, the current internal state associated with the timestamp t will be updated in part based on the intermediate prior internal state $C_{t-1}'$.

Candidate internal state generator 304 can generate a candidate current internal state $\tilde{C}_t$. The candidate current internal state $\tilde{C}_t$ can be generated based on the current input vector $i_t$, and can be combined with intermediate prior internal state $C_{t-1}'$ to generate the current internal state $C_t$. Candidate internal state generator 304 may generate the candidate current internal state $\tilde{C}_t$ based on the following equation:

$$\tilde{C}_t=\tanh(W_C \cdot [O_{t-1}, i_t]+b_c) \quad \text{(Equation 4)}$$

In Equation 4, $W_C$ can be a weights vector associated with the candidate internal state generation, whereas $b_c$ can be a bias factor associated with the candidate internal state generation. Both $W_C$ and $b_c$ can be obtained from training. Weights $W_C$ and bias $b_c$ can be set to maximize the probability of prediction model 108 outputting the pre-determined words from the sequence of audio signals, which includes increasing or decreasing the influences exerted by the immediate prior output on the processing of a current set of audio signals. To achieve that, weights $W_C$ and bias $b_c$ can be set, for each of the set of words included (or reflected) in the prior values of the internal state, to selectively emphasize or deemphasize the influence of certain immediate prior outputs on the processing of a current set of audio signals. For example, weights $W_C$ and bias $b_c$ may be set to maximize the probability of the determining the word "pizza" (food) from a current set of audio signals based on that the prior output that immediately precedes the current set of audio signal was "order." On the other hand, weights $W_C$ and bias $b_c$ may also be set to minimize the probability of determining the word "pizza" from the audio signals, if the prior output that immediately precedes the current set of audio signal was "Mister."

Referring back to FIG. 3B, $O_{t-1}$ is output vector associated with a prior timestamp t−1, whereas $i_t$ is the input vector associated with a current timestamp t, as discussed above. Tanh can be a hyperbolic tangent function, and can accept an input and map the input to a fractional value between −1 and 1. The tanh function can be configured as an activation function, and also be represented by a mapping table that maps a set of input values (x) to a set of corresponding output values (tanh(x)).

In Equation 4, $W_C \cdot [O_{t-1}, i_t]$ may represent a dot product between weights vector $W_C$ and output vector $O_{t-1}$ and input vector $i_t$. In lieu of performing floating-point multiplications, candidate internal state generator 304 may employ a probabilistic switch and an accumulator to estimate the value of $W_C \cdot [O_{t-1}, i_t] + b_c$. Candidate internal state generator 304 can then generate the sum, and then refer to a mapping table representing a tanh function to obtain candidate current internal state $\tilde{C}_t$, and provide candidate current internal state $\tilde{C}_t$ to internal state processor 306.

Internal state processor 306 can generate the current state $C_t$ based on intermediate prior internal state $C_{t-1}'$, and candidate current internal state $\tilde{C}_t$. In particular, internal state processor 306 can generate an input factor j to scale each element of candidate current internal state $\tilde{C}_t$, to obtain an intermediate candidate current internal state $\tilde{C}_t'$, as follows:

$$\tilde{C}_t' = j \times \tilde{C}_t \quad \text{(Equation 5)}$$

In lieu of performing floating-point multiplications, internal state processor 306 can employ a probabilistic switch, controlled based on input factor j, to perform an estimation of a result of multiplication between the input factor j and candidate current internal state $\tilde{C}_t$, to obtain an intermediate candidate current internal state $\tilde{C}_t'$.

Internal state processor 306 can generate the input factor j based on the following equation:

$$j = \alpha(W_i \cdot [O_{t-1}, i_t] + b_i) \quad \text{(Equation 6)}$$

In Equation 6, $W_i$ can be a weights vector associated with the input factor generation, whereas $b_i$ can be a bias factor associated with the input factor generation. Both $W_i$ and $b_i$ can be obtained from training. Weights $W_i$ and bias $b_i$ can be set to maximize the probability of prediction model 108 outputting the pre-determined words from the sequence of audio signals, which includes increasing or decreasing the influences exerted by candidate current internal state $\tilde{C}_t'$ on the generation of the current internal state. As discussed above, the internal state maintains the history of processing of the audio signals. In some cases the candidate current internal state is to be emphasized (relative to the prior internal state) so that the candidate current internal state can exert more influence on the processing of the current set of audio signals, whereas in some cases the prior internal state is to be emphasized instead. To achieve that, weights $W_i$ and bias $b_i$ can be set, for each of the set of words included (or reflected) in the candidate current state, to selectively emphasize or deemphasize the influence of the candidate current state on the processing of a current set of audio signals. For example, weights $W_i$ and bias $b_j$ may be set to emphasize the prior history of outputting a set of words related to the action of food ordering (e.g., including words related to the restaurant names, combination of verbs "would like", "order", etc.), when words indicating the food ordered by the action was absent in the history. On the other hand, weights $W_i$ and bias $b_j$ may be set to deemphasize the history of outputting words related to food ordering, if words including complete information of a food ordering action (e.g., the restaurant and food information) have been output, based on a determination that the subsequent audio signals may be less likely to be related to food ordering.

Referring back to FIG. 3B, $O_{t-1}$ is output vector associated with a prior timestamp t−1, whereas $i_t$ is the input vector associated with a current timestamp t, as discussed above. σ can be the same sigmoid function as in Equation 2. In lieu of performing floating-point multiplications, internal state processor 306 may also employ a probabilistic switch, controlled based on $O_{t-1}$ and $i_t$, and an accumulator to estimate the value of $W_i \cdot [O_{t-1}, i_t] + b_i$. Internal state processor 306 can map the estimated value using a mapping table representing the sigmoid function to obtain the input factor j.

Internal state generator 306 can then generate the current state $C_t$ based on a sum of intermediate prior internal state $C_{t-1}'$ and intermediate candidate current internal state $\tilde{C}_t'$ based on the following equations:

$$C_t = C_{t-1}' + \tilde{C}_t' \quad \text{(Equation 7)}$$

Equation 7 can be rewritten based on forget factor $f$, input factor j, prior internal state $C_{t-1}$, and candidate current internal state $\tilde{C}_t$, as follows:

$$C_t = f \times C_{t-1} + j \times \tilde{C}_t \quad \text{(Equation 8)}$$

In Equation 8, $f$ is the forget factor, whereas j is the input factor. As discussed above, LSTM processing node 300 can selectively accumulate the history of prior processing in the internal state, and can do so by performing a weighted combination of $\tilde{C}_t$ and $C_{t-1}$. In a case where the influence of the history on the internal state on the processing of the current input is to be reduced, LSTM processing node 300 can reduce the forget factor $f$ associated with prior internal state $C_{t-1}$ and/or increase the input factor j associated with candidate current state $\tilde{C}_t$ (e.g., referring to the example above, to deemphasize the influence of the previously-determined output "order" on determining whether the audio signal corresponds to the name "Piazza" or food "pizza"). In lieu of floating-point multiplications, historical state processor 302 and internal state processor 306 can employ probabilistic switches, which are controlled based on forget factor $f$ and input factor j, and an accumulator, to generate the current state $C_t$, which can then be provided to output generator 308.

Output generator 308 can generate the current output vector $O_t$, which is associated with a current timestamp t, based on the current state $C_t$, and an output factor k. The output factor k may determine a contribution of the current output vector $O_t$ to the classification decision. For example, as discussed with respect to FIG. 2, prediction model 108 may generate a decision based on a weighted sum of the output vectors from each of the processing nodes in layer 210, and the output factor k can provide the weight for each of the processing nodes. Output generator 308 can generate the output factor k based on the following equation:

$$k = \sigma(W_o \cdot [O_{t-1}, i_t] + b_o) \quad \text{(Equation 9)}$$

In Equation 9, $W_o$ can be a weights vector associated with the output factor generation, whereas $b_o$ can be a bias factor associated with the output factor generation. Both $W_o$ and $b_o$ can be obtained from training. $O_{t-1}$ is output vector associated with a prior timestamp t−1, whereas $i_t$ is the input vector associated with a current timestamp t, as discussed above. σ can be the same sigmoid function as in Equation 2. In lieu of performing floating-point multiplications, output generator 308 may also employ a probabilistic switch, controlled based on $O_{t-1}$ and $i_t$, together with an accumulator, to perform an estimation of the value of $W_o \cdot [O_{t-1}, i_t]+b_o$. Output generator 308 can then map the estimation result using a mapping table representing the sigmoid function to obtain the output factor k.

With the output factor k, output generator 308 can generate current output vector $O_t$ from output factor k and current internal state $C_t$, based on the following equation:

$$O_t = k \times \tanh(C_t) \quad \text{(Equation 10)}$$

Based on equation 10, output generator 308 can map a value of current internal state $C_t$ (output of internal state processor 306) using a mapping table of tanh function to obtain the value of $\tanh(C_t)$. Moreover, output generator 308 can employ a probabilistic switch, controlled based on output factor k, to perform an estimation of the product between the output factor k and $\tanh(C_t)$, to obtain current output vector $O_t$.

Figure 4:
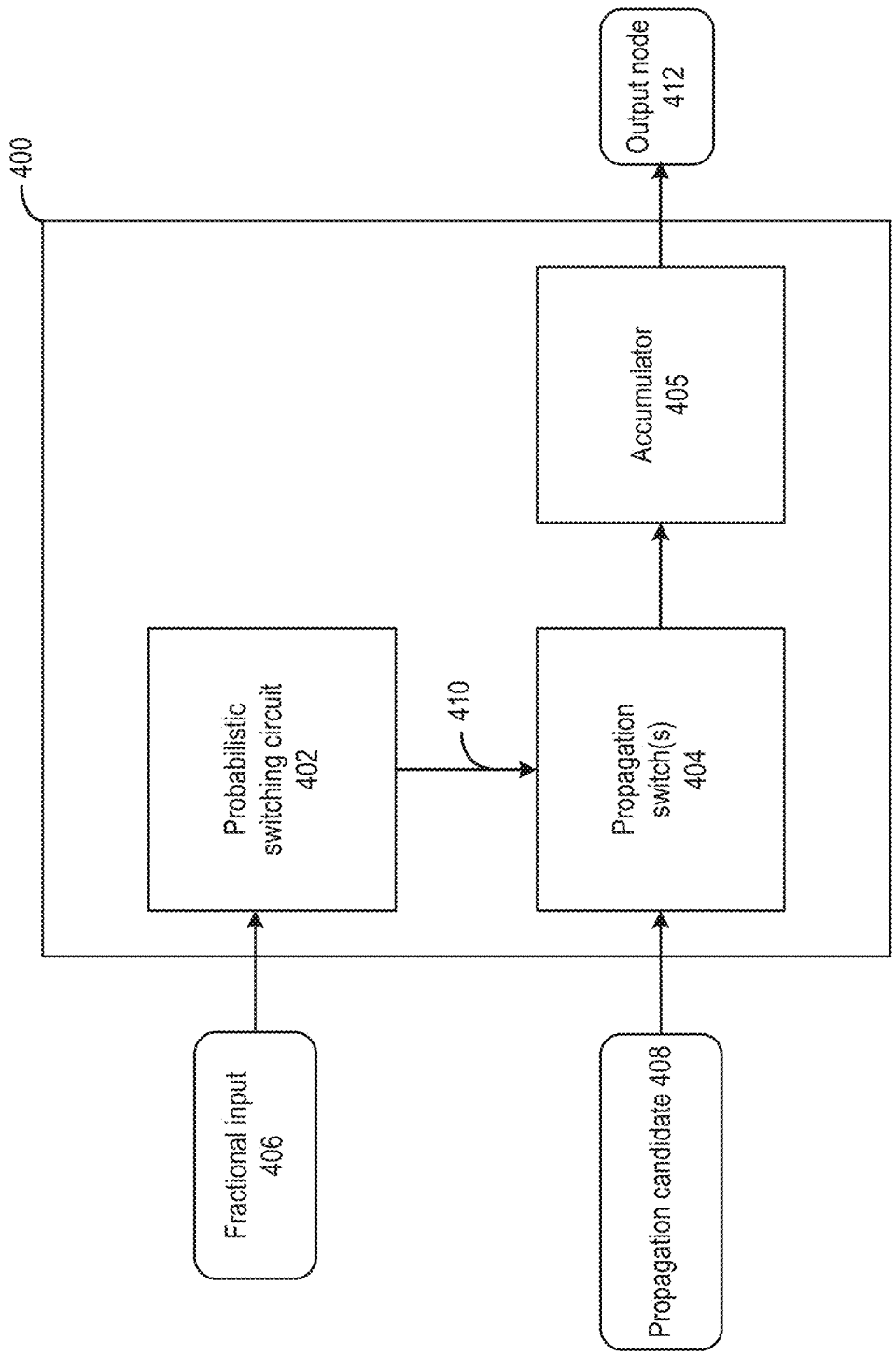
FIG. 4 is a simplified block diagram of an example of a probabilistic circuit, according to certain aspects of the present disclosure.

Reference is now made to FIG. 4, which illustrates an example of a probabilistic circuit 400 that can be used to implement the functionality of LSTM processing node 300 of FIG. 3B, according to certain aspects of the present disclosure. For example, in a case where LSTM processing node 300 includes a set of software routines to perform computation, probabilistic circuit 400 can be coupled with a hardware processor that executes the software routines of LSTM processing node 300, and provides computing resources to compute the internal state, the outputs, etc. according to any of equations 1-10. As another example, in a case where LSTM processing node 300 includes a set of hardware circuitries to perform computation, probabilistic circuit 400 can be part of the hardware circuitries of LSTM processing node 300.

As shown in FIG. 4, probabilistic circuit 400 includes a probabilistic switching circuit 402, propagation switch(es) 404, and, optionally, an accumulator 405. Propagation switch(es) 404 and optional accumulator 405 can be part of an output generation circuit to provide an output to output node 412. Probabilistic switching circuit 402 can receive fractional input(s) 406, which has a magnitude of, for example, between 0 and 1. Probabilistic switching circuit 402 can be configured as a random decision generator circuit which can be configured to generate a decision at a probability that corresponds to a configuration value. For example, probabilistic switching circuit 402 can generate switch signal(s) 410 to control propagation switch(es) 404. Each switch signal(s) 410 can be a binary signal that toggles between two states (e.g., a digital signal that toggles between a logical one and a logical zero). Fractional input(s) 406 can provide a configuration value to set the probability of a logical state of switch signal(s) 410. The probability of the logical state, in turn, controls the probability at which propagation switch(es) 404 propagates propagation candidate(s) 408 to output node 412. For example, if switch signal(s) 410 is a logical one, propagation switch(es) 404 may propagate propagation candidate(s) 408 to output node 412. On the other hand, if switch signal(s) 410 is a logical zero, propagation switch(es) 404 may block propagation candidate(s) 408 from reaching output node 412. If the magnitude of fractional input(s) 406 is 0.3, probabilistic switching circuit 402 can set the probability of switch signal(s) 410 being at logical one to be at 0.3, and the probability of switch signal(s) 410 being at logical zero to be at 0.7. Propagation switch(es) 404, controlled by probabilistic switching circuit 402, can also propagate propagation candidate(s) 408 at a probability of 0.7, and block propagation candidate(s) 408 at a probability of 0.3.

Accumulator 405 may be interposed between propagation switch(es) 404 and output node 412 in a case where probabilistic circuit 400 is used to estimate a summation of products (e.g., for dot product estimation), to add a constant to an estimated multiplication product, etc. In such a case, probabilistic circuit 400 may include multiple propagation switches 404 to control the propagations of multiple propagation candidates 408 to accumulator 405, with each of multiple propagation switches 404 being controlled by a corresponding switch signal(s) 410 that toggles between logical states at a probability set based on a corresponding fractional input(s) 406. Accumulator 405 can accumulate the propagation candidate(s) 408 propagated by propagation switch(es) 404, together with other optional constant values, to generate the output at output node 412. Output node 412 may be connected to, for example, internal nodes of LSTM processing node 300 or, referring back to FIG. 2, layer 212 of prediction model 108. Layer 212 may include a classifier output generation circuit to accumulate the outputs of each of LSTM processing node 300 of layer 210 of prediction model 108, to generate a classifier output (e.g., whether the audio sequence corresponds to the word "pizza" or "Piazza").

LSTM processing node 300 can use probabilistic circuit 400 to perform at least some of the dot-product and scaling operations as discussed above. For example, referring back to equation 1 for generation of forget factor $f$, historical state processor 302 can use probabilistic circuit 400 to probabilistically propagate elements of the $W_f$ vector at a probability set based on the corresponding values of prior output vector $O_{t-1}$ and current input vector $i_t$. The corresponding values of prior output vector $O_{t-1}$ and current input vector $i_t$ can be provided to probabilistic switching circuit 402 as fractional input 406, whereas elements of the $W_f$ vector can be provided to probabilistic switch(es) 404 as propagation candidate 408.

As an illustrative example, a first element of prior output vector $O_{t-1}$ can include a fractional input of 0.125, whereas a first element of current input vector $i_t$ can include a fractional input of 0.5. According to equation 1 as described above, the first element of prior output vector $O_{t-1}$ is to be multiplied with the first element of $W_f$ vector, and the first element of current input vector $i_t$ is to be multiplied with the second element of $W_f$ vector. To provide an estimation of the multiplication product between the first element of prior output vector $O_{t-1}$ and the first element of $W_f$ vector, probabilistic circuit 400 can probabilistically propagate the first element of $W_f$ vector at a probability of 12.5% corresponding to the fractional input of 0.125 of the first element of prior output vector $O_{t-1}$. Moreover, probabilistic circuit 400 can also probabilistically propagate the second element of $W_f$ at a probability of 50% corresponding to the fractional input of 0.5 of the first element of current input vector $i_t$. The propagated $W_f$ vector elements can be accumulated in accumulator 405, together with the bias factor $b_f$, to generate output node 412, which can provide an estimation of the value $W_f \cdot [O_{t-1}, i_t] + b_f$. The components of probabilistic circuit 400, including probabilistic switching circuit 402, propagation switch(es) 404, accumulator 405, etc. can be included in, or otherwise used by, each of the historical state processor 302, candidate internal state generator 304, internal state processor 306, and output generator 308. For example, candidate internal state generator 304, internal state processor 306, and output generator 308 can incorporate or use probabilistic circuit 400 to generate, respectively, candidate current internal state $\tilde{C}_t$, input factor j, and output factor k from output vector $O_{t-1}$ and input vector $i_t$ using probabilistic circuit 400, in a similar manner as the generation of forget factor $f$.

Moreover, LSTM processing node 300 can also use probabilistic circuit 400 to generate the current internal state $C_t$. For example, as discussed with respect to equation 8, the current internal state $C_t$ can be generated based on a weighted combination of input factor j, prior internal state $C_{t-1}$, and candidate current internal state $\tilde{C}_t$, where prior internal state $C_{t-1}$ can be scaled by forget factor $f$ and candidate current internal state $C_t$ can be scaled by input factor j. Internal state processor 306 can use (or include) probabilistic circuit 400 to perform the probabilistic combination of prior internal state $C_{t-1}$ and candidate current internal state $\tilde{C}_t$. Forget factor $f$ and input factor j can be provided to probabilistic switching circuit 402 as fractional input 406. Prior internal state $C_{t-1}$ and candidate current internal state $\tilde{C}_t$ can be provided to propagation switch(s) 404 as propagation candidate 408. For example, in a case where forget factor $f$ equals 0.3, probabilistic switching circuit 402 can generate switch signal 410 to cause propagation switch(s) 404 to propagate prior internal state $C_{t-1}$ to accumulator 405 at a probability of 30% (0.3). Also, in a case where input factor j equals 0.6, probabilistic switching circuit 402 can generate switch signal 410 to cause propagation switch(es) 404 to candidate current internal state $\tilde{C}_t$ to accumulator 405 at a probability of 60% (0.6). Accumulator 405 can accumulate the propagated prior internal state $C_{t-1}$ and candidate current internal state $\tilde{C}_t$ to generate a value for estimating current internal state $C_t$ (e.g., based on Equation 8), and provide the estimated value to output generator 308.

LSTM processing node 300 can also use probabilistic circuit 400 to generate the current output vector $O_t$. For example, as discussed with respect to Equation 10, output generator 308 can generate output vector $O_t$ by scaling $\tanh(C_t)$ with output factor k. Output generator 308 can map the estimated value of current internal state $C_t$ using a tanh mapping table to generate $\tanh(C_t)$, and use (or include) probabilistic circuit 400 to perform probabilistic propagation of the value of $\tanh(C_t)$ to the upper layer of prediction model 108 (e.g., layer 212 of FIG. 2) at a probability based on output factor k. Output factor k can be provided to probabilistic switching 402 as fractional input 406, whereas $\tanh(C_t)$ can be provided to probabilistic switch(es) 404 as propagation candidate 408. For example, in a case where output factor k equals 0.3, probabilistic switching circuit 402 can generate switch signal(s) 410 to cause propagation switch(es) 404 to propagate $\tanh(C_t)$ to the upper layer at a probability of 30% (0.3). The upper layer can then generate the decision based on, for example, accumulation and weighted averaging of the outputs received from each processing node from layer 210.

Figure 5:
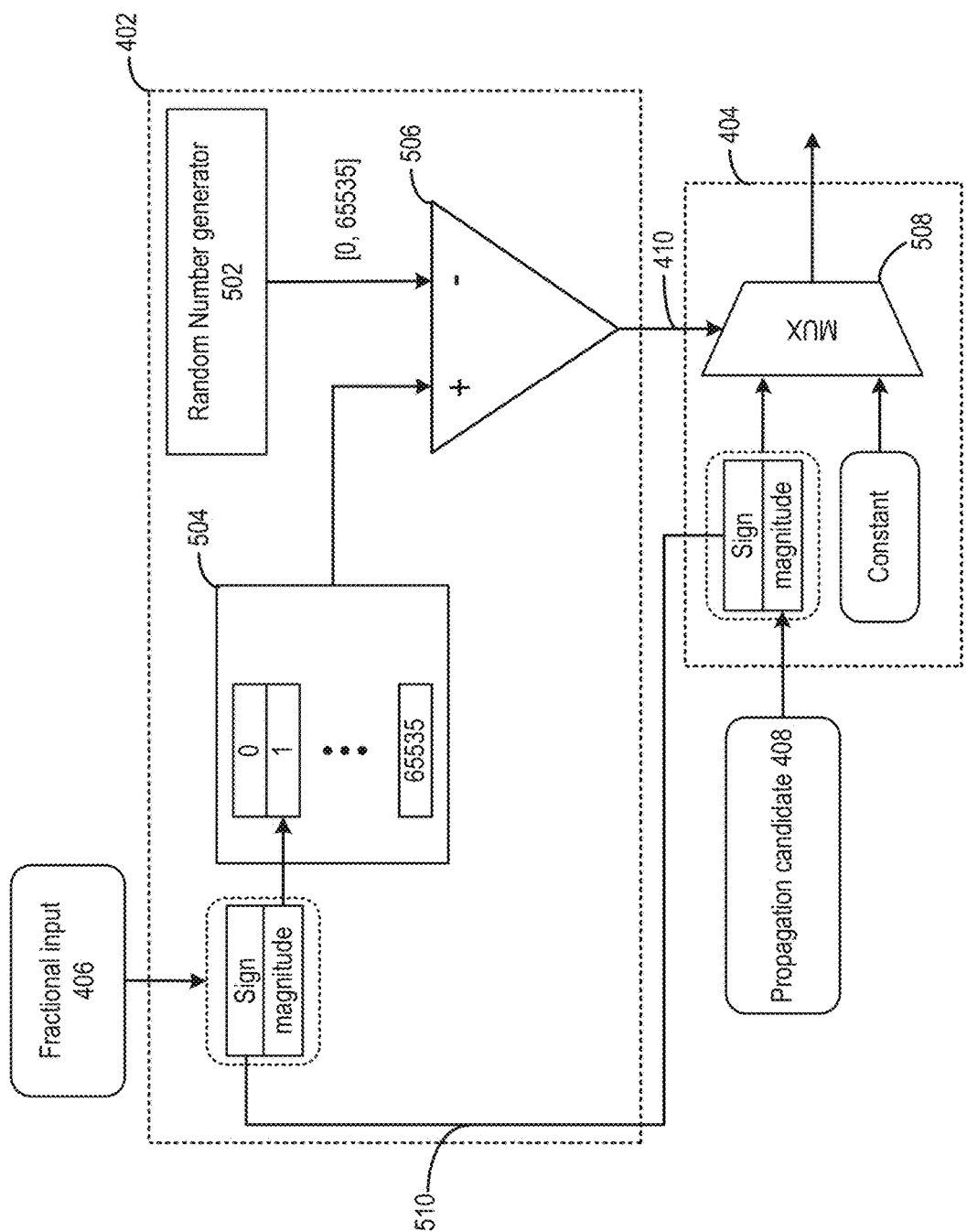
FIG. 5 is a simplified block diagram of example components of the probabilistic circuit of FIG. 4, according to certain aspects of the present disclosure.

FIG. 5 illustrates an example of components of probabilistic switching circuit 402 and propagation switch(s) 404, according to aspects of the present disclosure. As shown in FIG. 5, probabilistic switching circuit 402 may include a random number generator 502, a threshold generator 504, and a comparator 506. Moreover, each of the propagation switches 404 may include a multiplexer circuit 508. Further, probabilistic switching circuit 402 may also transmit, in addition to switch signal 410, a sign signal 510 to propagation switch(es) 404.

Random number generator 502 may be configured to generate a number based on a uniform random distribution within a range, such that each number within the range is equally likely to be output by random number generator 502. For example, random number generator 502 may be configured to output an integer within the range of 0 to 65,535, and any integer within the range stands a chance of 1/65,535 to be output by random number generator 502. In some embodiments, random number generator 502 may include a pseudo random number generator, such as a feedback shift register (LSFR), which can generate numbers at a degree of randomness that approaches uniform distribution. In one example, a 32-bit LSFR can be used as part of random number generator 502, and the last 16 bits of the LSFR can be used to provide an integer within the range of 0 to 65,535.

Threshold generator 504 can be used to generate a threshold. The threshold is to be provided to comparator 506, which can compare the threshold against the number generated by random number generator 502 to generate switch signal 410. The threshold can be configured to configure a probability of a logical state of switch signal 410. In the example of FIG. 5, to control comparator 506 to generate a logical one with the probability of P, the threshold can be set based on the following equation:

$$\text{Threshold} = P \times \text{Range} \quad \text{(Equation 11)}$$

In equation 11, the range is the range for a number generated by random number generator 502. In the example of FIG. 5, the range can be 65,535. Assuming that comparator 506 is to generate a logical one with the probability P of 0.2 (⅕), the threshold can be set based on scaling the range (65,535) by a number representing the probability P (0.2), which is 13,107. Each time random number generator 502 is triggered to generate a new number and provide the new number to comparator 506 to compare against a threshold of 13,107, there will be approximately 20% probability for comparator 506 to generate a logical one for switch signal 410. Assuming that a propagation switch 404 propagates a propagation candidate 408 when a switch signal 410 is at logical one, there will also be approximately 20% probability for propagation switch(ss) 404 to propagate propagation candidate 408.

In the example of FIG. 5, threshold generator 504 can generate the threshold based on fractional input 406. As discussed above, fractional input 406 may receive a value for which the magnitude is between 0 and 1, including input vector $I_t$ and output vector $O_{t-1}$ (both are within the range of −1 to +1, therefore their magnitudes are between 0 and 1). Moreover, forget factor $f$, input factor j, and output factor k are generated from a sigmoid function and have magnitudes between 0 and 1. In the example of FIG. 5, threshold generator 504 may store an array of candidate threshold values that range from 0 to 65535, each associated with an address. Threshold generator 504 can retrieve, from the array, a candidate threshold value that represents a scaling of the random number range (e.g., 65,535) by fractional input 406 by determining an address based on the fractional input 406. For example, threshold generator 504 may maintain an address mapping table that maps ranges of fractional input 406 to the addresses, and determines the address (and the threshold) from the address mapping table. Moreover, in a case where fractional input 406 can be a negative number (e.g., input vector $I_t$ and output vector $O_{t-1}$), probabilistic switching circuit 402 can also obtain the sign information of fractional input 406, and pass the information to propagation switch(es) 404.

Propagation switch(es) 404 includes a multiplexer circuit 508 to select between propagation candidate 408, or a pre-determined constant (e.g., zero), for propagation to an output (e.g., accumulator 405 of FIG. 4, upper layer 212, etc.). As discussed above, the selection is based on the logical state of switch signal 410. Moreover, propagation switch(s) 404 also receive sign signal 510 from switching circuit 402, and can propagate the signal information (of fractional input 406) together with the magnitude of propagation candidate 408. As discussed above, fractional input 406 can be negative (e.g., current input vector $I_t$ and prior output vector $O_{t-1}$). To more accurately approximate the dot-product computation of equations 1, 4, 6, and 9, propagation switch(es) 404 can propagate the negative sign information of current input vector $I_t$ and prior output vector $O_{t-1}$ to accumulator 405, which can then accumulate the propagated weights (e.g., $W_f$, $W_c$, $W_i$, and $W_o$), and the associated bias (e.g., $b_f$, $b_c$, $b_i$, and $b_o$) based on equations 1, 4, 6, and 9.

While FIG. 5 illustrates examples of components of probabilistic switching circuit 402 and propagation switch(es) 404, it is understood that not all of these components need to be incorporated by each of historical state processor 302, candidate internal state generator 304, internal state processor 306, and output generator 308 to perform the disclosed techniques. For example, the candidate threshold values array and the address mapping table of threshold generator 504 can be shared between historical state processor 302, candidate internal state generator 304, internal state processor 306, and output generator 308. Each processor can access the candidate threshold values array and the address mapping table to obtain the threshold. In some embodiments, some or all of these processors can also share random number generator 502 by, for example, tapping off from different sets of bits of random number generator 502.

Figure 6:
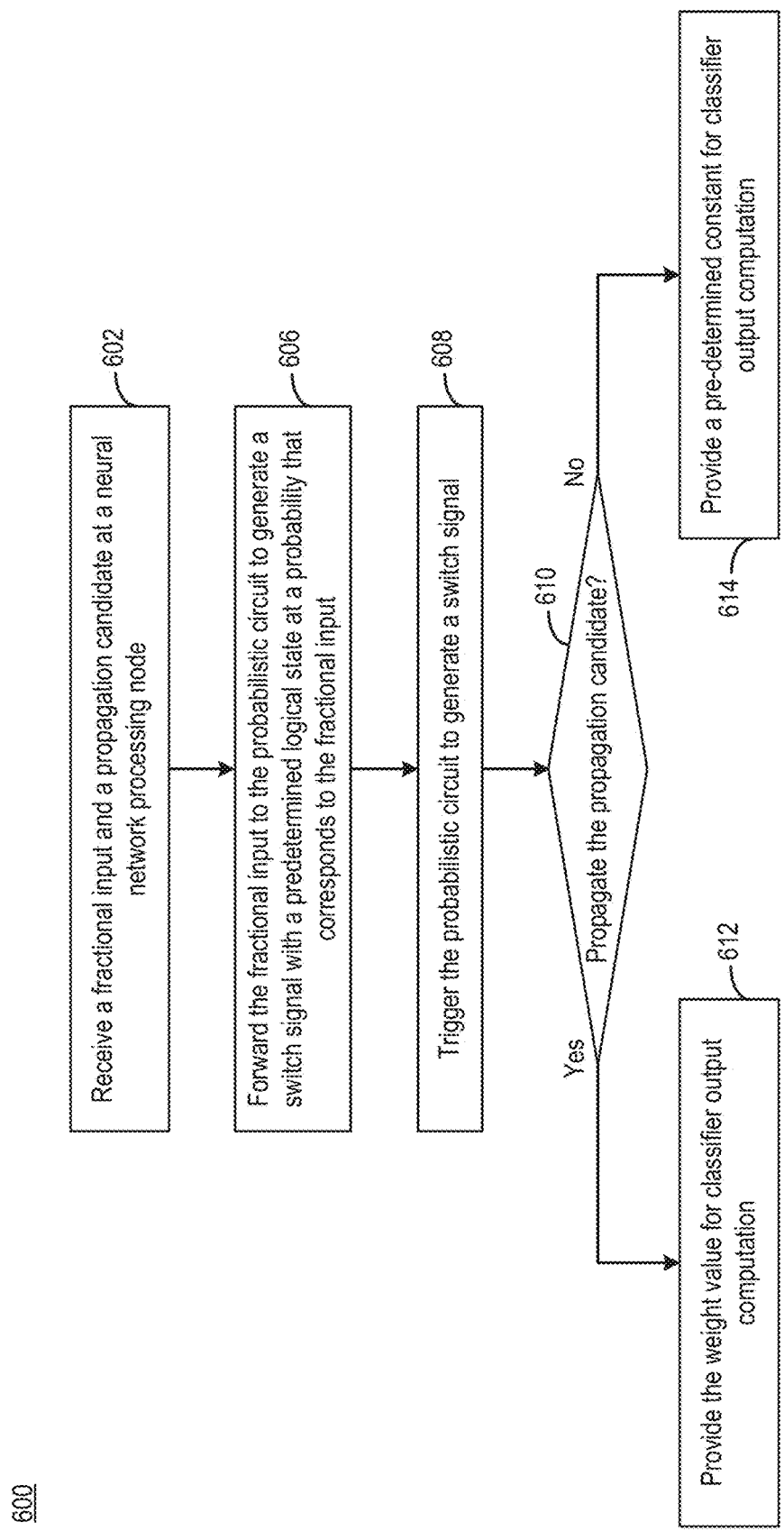
FIG. 6 illustrates an example flow diagram of a process for performing a computation at a neural network processing node, according to certain aspects of the present disclosure.

FIG. 6 illustrates an example flow diagram of a process 600 for performing a computation at a neural network processing node, according to certain aspects of the present disclosure. The process may be implemented by the processing node of an artificial neural network (e.g., a processing node of FIG. 2, LSTM processing node 300 of FIG. 3, etc.), in combination with a probabilistic circuit (e.g., probabilistic circuit 400 of FIG. 4).

At operation 602, the processing node receives a fractional input and a propagation candidate. The fractional input may be used for scaling the propagation candidate to generate an output for the classification decision. The fractional input may include, for example, current input vector $I_t$ and prior output vector $O_{t-1}$, forget factor $f$, input factor $j$, and output factor $k$. The propagation candidate may include, for example, prior internal state $C_{t-1}$, candidate current internal state $\tilde{C}_t$, and intermediate output $\tanh(C_t)$.

At operation 606, the processing node forwards the fractional input to the probabilistic circuit to generate a switch signal with a predetermined logical state at a probability that corresponds to the fractional input. The probabilistic circuit may include, for example, probabilistic switching circuit 402, which includes random number generator 502, threshold generator 504, and comparator 506. The threshold generator 504 can generate a threshold based on the fractional input and a range of numbers generated by random number generator 502. Each time the random number generator 502 is triggered to generate a new number and provide the new number to comparator 506, the comparator 506 can generate a logical one for the switch signal at a probability that corresponds to the fractional input.

At operation 608, the processing node can trigger the probabilistic circuit to generate the switch signal. The switch signal may probabilistically include the predetermined logical state (e.g., logical one), at a probability that corresponds to the fractional input.

At operation 610, the probabilistic circuit may determine whether to propagate the propagation candidate based on whether the logical state satisfies a predetermined condition (e.g., whether the logical state is a one). If the logical state is determined as one (at operation 610), the probabilistic circuit may propagate the propagation candidate for classifier output computation, at operation 612. On the other hand, if the logical state is determined as zero (at operation 610), the probabilistic circuit may propagate a pre-determined constant (e.g., zero) for classifier output computation. The propagated values can be accumulated by an accumulator for further processing.

Figure 7:
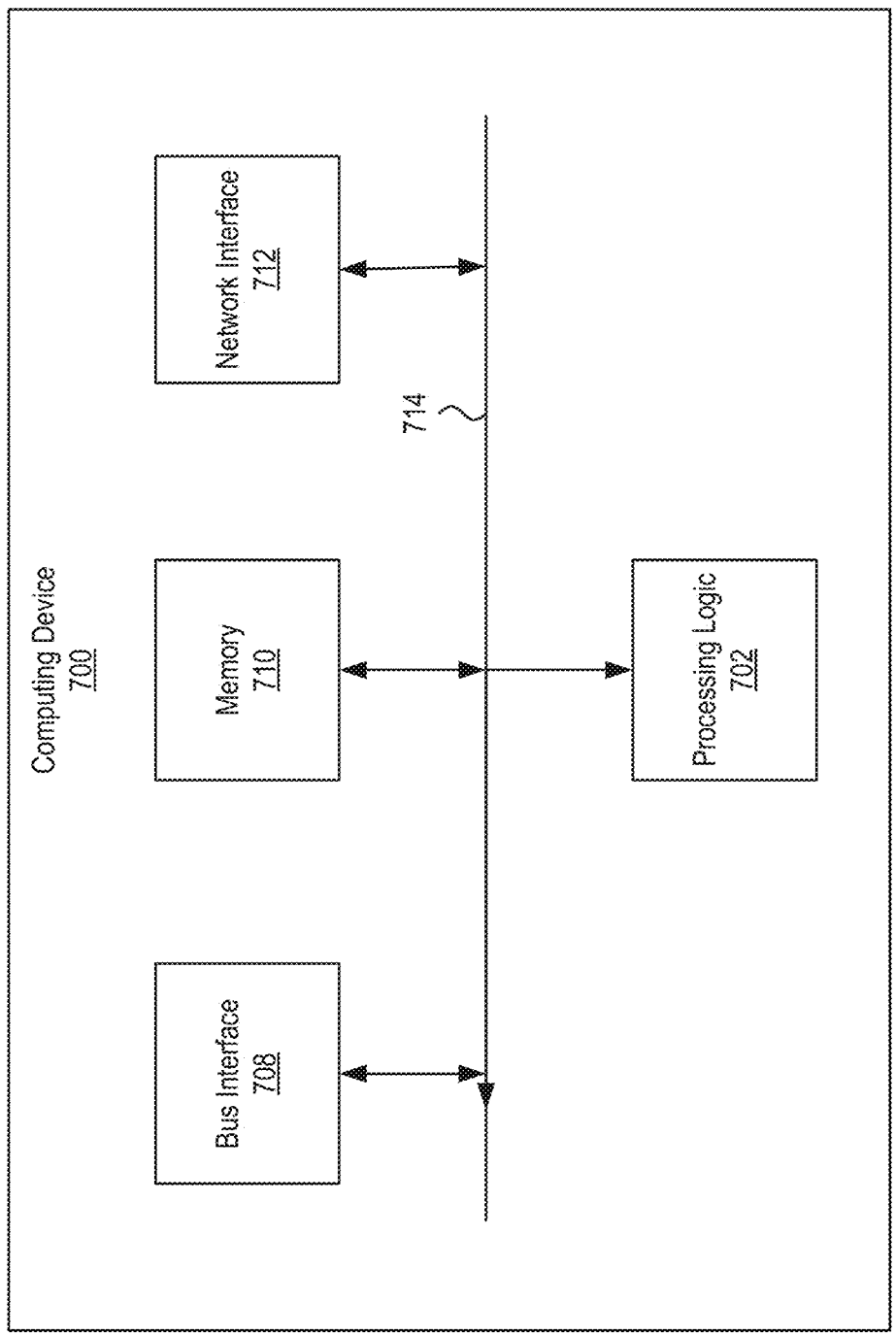
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. A computing device 700 may perform computations to facilitate processing of a task. As an illustrative example, computing device 700 can be part of a server in a multi-tenant compute service system. Various hardware and software resources of computing device 700 (e.g., the hardware and software resources associated with provision of a personal assistant service) can be allocated to a client upon request.

In one example, the computing device 700 may include processing logic 702, a bus interface module 708, memory 710, and a network interface module 712. These modules may be hardware modules, software modules, or a combination of hardware and software. In certain instances, modules may be interchangeably used with components or engines, without deviating from the scope of the disclosure. The network device 700 may include additional modules, not illustrated here, such as components discussed with respect to the nodes disclosed in FIG. 8. In some implementations, the network device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710. Processing logic 702 may also include hardware circuities for performing artificial neural network computation including, for example, probabilistic circuit 400 as described in FIG. 4 and FIG. 5.

The access to processing logic 702 can be granted to a client to provide the personal assistant service requested by the client. For example, computing device 700 may host a virtual machine, on which a personal assistant service software application can be executed. The personal assistant service software application, upon execution, may access processing logic 702 to predict, for example, a sequence of words uttered by a person operating the client device, and to perform an errand (e.g., to connect to a webpage of a restaurant to put in a food order) on behalf of the person based on the prediction. As another example, access to processing logic 702 can also be granted as part of bare-metal instance, in which a personal assistant service software application executing on a client device (e.g., a remote computer, a smart phone, etc.) can directly access processing logic 702 to perform the prediction of the sequence of words, and to perform the errand based on the prediction.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the network device 700, while in other cases some or all of the memory may be external to the network device 700. The memory 710 may store an operating system comprising executable instructions that, when executed by the processing logic 702, provides the execution environment for executing instructions providing networking functionality for the network device 700. The memory 710 may also store, for example, software applications for performing artificial neural network computation. For example, memory 710 may store software routines related to the computations of equations 1-10 above, and can interface with probabilistic circuit 400 to perform estimation of at least some of the dot-product and scaler multiplications of equations 1-10.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the network device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 700 may include multiple network interface modules, each configured to communicate with a different network. For example, in these implementations, the network device 700 may include a network interface module for communicating with a wired Ethernet network, a wireless 802.11 network, a cellular network, an Infiniband network, etc. In some embodiments, computing device 700 may receive a set of parameters, such as the aforementioned weight vectors for generation of forget gate factor, input factor, output factor, etc. from a server through network interface module 712.

The various components and modules of the network device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems as disclosed with respect to FIG. 8.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   receiving a fractional input and a propagation candidate at a probabilistic circuit, the probabilistic circuit including a probabilistic switching circuit and a propagation switch;
   forwarding the fractional input to the probabilistic switching circuit to cause the probabilistic switching circuit to set a comparison threshold value based on the fractional input and to generate a switch signal with a predetermined logical state at a probability based on the comparison threshold value;
   triggering the probabilistic switching circuit to generate the switch signal;
   providing the switch signal to the propagation switch; and
   propagating, using the propagation switch and based on a logical state of the switch signal, the propagation candidate to generate a classifier output.

2. The method of claim 1, wherein triggering the probabilistic switching circuit to generate the switch signal comprises:
   triggering a set of linear feedback shift registers to generate a number; and
   obtaining the switch signal as a result of comparison between the number and the comparison threshold value.

3. The method of claim 2, wherein the propagation candidate is propagated using a multiplexer based on the logical state of the switch signal.

4. The method of claim 1, wherein the classifier output is generated using an activation function.

5. The method of claim 4, further comprising:
   accessing a mapping table that represents the activation function to generate the classifier output.

6. The method of claim 1, wherein the probabilistic circuit further includes an accumulator, and wherein the method further comprises:
   accumulating, using the accumulator, the propagation candidate with other propagation candidates to generate the classifier output.

7. An integrated circuit device comprising:
   a probabilistic switching circuit configured to:
      receive a fractional input;
      set a comparison threshold value based on the fractional input;
      generate a switch signal with a predetermined logical state at a probability based on the comparison threshold value; and
      output the switch signal; and
   a propagation switch coupled to the probabilistic switching circuit, wherein the propagation switch is configured to:
      receive the switch signal from the probabilistic switching circuit;
      receive a propagation candidate; and
      propagate, based on a logical state of the switch signal, the propagation candidate to generate a classifier output.

8. The integrated circuit device of claim 7, wherein the probabilistic switching circuit is further configured to:
   trigger a set of linear feedback shift registers to generate a number; and
   obtain the switch signal as a result of comparison between the number and the comparison threshold value.

9. The integrated circuit device of claim 8, wherein the propagation candidate is propagated using a multiplexer based on the logical state of the switch signal.

10. The integrated circuit device of claim 7, wherein the classifier output is generated using an activation function.

11. The integrated circuit device of claim 10, wherein the classifier output is generated by accessing a mapping table that represents the activation function.

12. The integrated circuit device of claim 7, further comprising:
    an accumulator configured to accumulate the propagation candidate with other propagation candidates to generate the classifier output.

13. A non-transitory computer-readable medium comprising instructions that, when executed by a processor, cause the processor to perform operations comprising:
- receiving a fractional input and a propagation candidate at a probabilistic circuit, the probabilistic circuit including a probabilistic switching circuit and a propagation switch;
- forwarding the fractional input to the probabilistic switching circuit to cause the probabilistic switching circuit to set a comparison threshold value based on the fractional input and to generate a switch signal with a predetermined logical state at a probability based on the comparison threshold value;
- triggering the probabilistic switching circuit to generate the switch signal;
- providing the switch signal to the propagation switch; and
- propagating, using the propagation switch and based on a logical state of the switch signal, the propagation candidate to generate a classifier output.

14. The non-transitory computer-readable medium of claim 13, wherein triggering the probabilistic switching circuit to generate the switch signal comprises:
- triggering a set of linear feedback shift registers to generate a number; and
- obtaining the switch signal as a result of comparison between the number and the comparison threshold value.

15. The non-transitory computer-readable medium of claim 14, wherein the propagation candidate is propagated using a multiplexer based on the logical state of the switch signal.

16. The non-transitory computer-readable medium of claim 13, wherein the classifier output is generated using an activation function.

17. The non-transitory computer-readable medium of claim 16, wherein the operations further comprise:
- accessing a mapping table that represents the activation function to generate the classifier output.

\* \* \* \* \*